(12) United States Patent
Maruyama et al.

(10) Patent No.: US 9,900,468 B2
(45) Date of Patent: Feb. 20, 2018

(54) IMAGE PROCESSING APPARATUS, AUTHENTICATION METHOD, AND RECORDING MEDIUM

(71) Applicant: Konica Minolta, Inc., Chiyoda-ku, Tokyo (JP)

(72) Inventors: Tomoko Maruyama, Toyokawa (JP); Ryosuke Nishimura, Toyokawa (JP); Toshiya Shozaki, Osaka (JP); Shoko Haba, Toyokawa (JP); Jun Shiraishi, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/240,469

(22) Filed: Aug. 18, 2016

(65) Prior Publication Data
US 2017/0054875 A1 Feb. 23, 2017

(30) Foreign Application Priority Data
Aug. 21, 2015 (JP) .................................. 2015-163606

(51) Int. Cl.
*H04N 1/04* (2006.01)
*H04N 1/44* (2006.01)
(Continued)

(52) U.S. Cl.
CPC ........... *H04N 1/4413* (2013.01); *G06F 21/35* (2013.01); *H04N 1/00204* (2013.01);
(Continued)

(58) Field of Classification Search
CPC ............... H04N 1/4413; H04N 1/4433; H04N 1/32101; H04N 1/32771; H04N 1/00204
(Continued)

(56) References Cited

U.S. PATENT DOCUMENTS

| 7,672,457 | B2 | 3/2010 | Nagano et al. |
| 9,088,961 | B1 * | 7/2015 | Davis .................... H04W 76/00 |

(Continued)

FOREIGN PATENT DOCUMENTS

| JP | 2010-034822 A | 2/2010 |
| JP | 2014-136411 A | 7/2014 |
| WO | 2005/004385 A1 | 1/2005 |

OTHER PUBLICATIONS

Notification of Reasons for Refusal dated Aug. 7, 2017 in corresponding Japanese Patent Application No. 2015-163606, and an English translation thereof (7 pages).

*Primary Examiner* — Houshang Safaipour
(74) *Attorney, Agent, or Firm* — Buchanan Ingersoll & Rooney PC

(57) ABSTRACT

An image processing apparatus includes: an authentication information requesting portion that transmits one or more requests for authentication information to a portable terminal apparatus upon receipt of a connection request therefrom, the connection request not requiring user identification; a first authentication portion that performs first authentication not requiring user identification by comparing authentication information to first reference data, the authentication information being received in return for the request; a second authentication portion that performs second authentication by comparing the authentication information to second reference data for user identification; and a processor that takes one piece of authentication information or any one of multiple pieces of authentication information received in return for the one or more requests, according to a predetermined rule, and that makes the second authentication portion perform the second authentication using the one piece of authentication information or the any one of the multiple pieces of authentication information.

25 Claims, 16 Drawing Sheets

(51) Int. Cl.
    *G06F 21/35*      (2013.01)
    *H04N 1/32*       (2006.01)
    *H04N 1/327*      (2006.01)
    *H04N 1/00*       (2006.01)

(52) U.S. Cl.
    CPC ..... *H04N 1/32101* (2013.01); *H04N 1/32771* (2013.01); *H04N 1/4433* (2013.01); *H04N 2201/0055* (2013.01); *H04N 2201/0094* (2013.01)

(58) Field of Classification Search
    USPC ........................................ 358/1.14, 1.15, 1.9
    See application file for complete search history.

(56) References Cited

U.S. PATENT DOCUMENTS

| | | | |
|---|---|---|---|
| 2003/0067624 A1* | 4/2003 | Anderson | G06F 3/1204 358/1.15 |
| 2006/0192990 A1* | 8/2006 | Tonegawa | H04N 1/00209 358/1.15 |
| 2010/0030707 A1 | 2/2010 | Jingu | |

\* cited by examiner

IMAGE PROCESSING APPARATUS, AUTHENTICATION METHOD, AND RECORDING MEDIUM

This application claims priority under 35 U.S.C. § 119 to Japanese Patent Application No. 2015-163606 filed on Aug. 21, 2015, the entire disclosure of which is incorporated herein by reference in its entirety.

BACKGROUND OF THE INVENTION

Field of the Invention

The present invention relates to: an image processing apparatus such as a multifunctional digital image processing apparatus (i.e., a multi-function peripheral abbreviated as MFP) having printer function, copier function, facsimile function, scanner function, and other functions; an authentication method for the image processing apparatus to implement when receiving a connection request from a portable terminal apparatus; and a recording medium.

Description of the Related Art

The following description sets forth the inventor's knowledge of related art and problems therein and should not be construed as an admission of knowledge in the prior art.

Printer drivers and printing applications allowing users to use an image processing apparatuses such as a MFP as described above are extensively installed on user terminals such as personal computers. Such a printer driver or printing application is configured to give to print data authentication information such as user identification information or department identification information in a printer job language (PJL) that works with the function of an image processing apparatus, and to transmit the print data to the image processing apparatus. Receiving the print data, the image processing apparatus prohibits the use by unauthenticated users by performing user authentication or department authentication using the authentication information described in PJL. That is, the image processing apparatus permits the use by only authenticated users registered in advance on the image processing apparatus itself.

In contrast, operating system (OS) standard printing applications called AIRPRINT and MOPRIA PLUG-IN, for example, are installed on portable terminal apparatuses such as smartphones. Such an OS standard printing application is not configured to give to print data authentication information such as user information in a form that works with the configuration of an image processing apparatus. The image processing apparatus cannot receive the authentication information accordingly. Here, there is a problem as described below.

With such an OS standard printing application as described above, the image processing apparatus cannot identify the user properly and cannot manage the authorized activities of the user.

Specifically, the image processing apparatus may be configured to permit printing by only registered users. In this case, the image processing apparatus will have an authentication error because of absence of user information and discard print data. Alternatively, the image processing apparatus may be configured to perform user authentication but permit the use also by public users. In this case, the image processing apparatus will recognize all print jobs as being given by public users. In whichever example, the image processing apparatus cannot manage the authorized activities of users (e.g., print volume use imitations and color printing restrictions) properly.

Alternatively, with such an OS standard printing application as described above, the image processing apparatus may be configured to store authentication information serving only for the judgment whether or not to permit a connection with the portable terminal apparatus and to judge whether or not to permit such a connection by comparing authentication information received from the portable terminal apparatus to the registered authentication information.

In this case, since the authentication information serves only for the judgment whether or not to permit a connection with the portable terminal apparatus, the image processing apparatus still cannot identify users and cannot manage the authorized activities of users.

According to a technique suggested in Japanese Unexamined Patent Publication No. 2010-034822, an image forming apparatus is configured to prompt for input of authentication information such as a user name and password before direct printing, and to compare input authentication information to authority information registered on the image forming apparatus itself. The image processing apparatus is further configured to perform charging and restrict printing without sacrificing the advantages of direct printing.

According to the technique described in Japanese Unexamined Patent Publication No. 2010-034822, however, the image forming apparatus performs user authentication for direct printing, not for remote printing from an OS standard printing application. Receiving a print job from an OS standard printing application, the image processing apparatus still cannot perform user authentication and cannot manage the authorized activities of users, which means that the above-described problem remains unresolved.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to an image processing apparatus including:

an authentication information requesting portion that transmits one or more requests for authentication information to a portable terminal apparatus upon receipt of a connection request from the portable terminal apparatus, the connection request not requiring user identification;

a first authentication portion that performs first authentication for the judgment whether or not to permit a connection with the portable terminal apparatus, the first authentication not requiring user identification, by comparing authentication information to first reference data, the authentication information being received from the portable terminal apparatus in return for the request being transmitted by the authentication information requesting portion;

a second authentication portion that performs second authentication for the judgment whether or not it is an authenticated user of the image processing apparatus, by comparing the authentication information to second reference data for user identification; and a processor that takes one piece of authentication information or any one of multiple pieces of authentication information according to a predetermined rule, the one piece of authentication information or the multiple pieces of authentication information, respectively, being received from the portable terminal apparatus in return for the one or more requests, and that makes the second authentication portion perform the second authentication using the one piece of authentication information or the any one of the multiple pieces of authentication information being taken.

A second aspect of the present invention relates to a non-transitory computer-readable recording medium storing an authentication program to make a computer of an image processing apparatus execute:

transmitting one or more requests for authentication information to a portable terminal apparatus upon receipt of a connection request from the portable terminal apparatus, the connection request not requiring user identification;

performing first authentication for the judgment whether or not to permit a connection with the portable terminal apparatus, the first authentication not requiring user identification, by comparing authentication information to first reference data, the authentication information being received from the portable terminal apparatus in return for the request being transmitted;

performing second authentication for the judgment whether or not it is an authenticated user of the image processing apparatus, by comparing the authentication information to second reference data for user identification; and taking one piece of authentication information or any one of multiple pieces of authentication information according to a predetermined rule, the one piece of authentication information or the multiple pieces of authentication information, respectively, being received from the portable terminal apparatus in return for the one or more requests, and performing the second authentication using the one piece of authentication information or the any one of the multiple pieces of authentication information being extracted being taken.

A third aspect of the present invention relates to an authentication method for an image processing apparatus, including:

transmitting one or more requests for authentication information to a portable terminal apparatus upon receipt of a connection request from the portable terminal apparatus, the connection request not requiring user identification;

performing first authentication for the judgment whether or not to permit a connection with the portable terminal apparatus, the first authentication not requiring user identification, by comparing authentication information to first reference data, the authentication information being received from the portable terminal apparatus in return for the request being transmitted;

performing second authentication for the judgment whether or not it is an authenticated user of the image processing apparatus, by comparing the authentication information to second reference data for user identification; and taking one piece of authentication information or any one of multiple pieces of authentication information according to a predetermined rule, the one piece of authentication information or the multiple pieces of authentication information, respectively, being received from the portable terminal apparatus in return for the one or more requests, and performing the second authentication using the one piece of authentication information or the any one of the multiple pieces of authentication information being extracted being taken.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
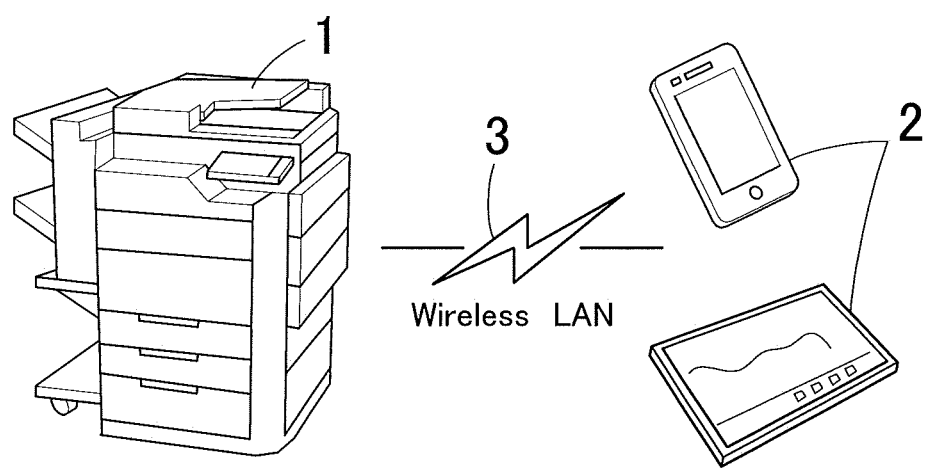
FIG. 1 illustrates a configuration of an image processing system provided with an image processing apparatus according to one embodiment of the present invention.

FIG. 1 illustrates a configuration of an image processing system provided with an image processing apparatus according to one embodiment of the present invention.

The image processing system is comprised of an image processing apparatus 1 and a portable terminal apparatus 2. The image processing apparatus 1 and the portable terminal apparatus 2 are configured to connect to each other in a wireless manner, for example, through a wireless local area network (wireless LAN) 3.

The image processing apparatus 1 generates a copy image from print data obtained by document scanning or print data received from the portable terminal apparatus 2 and forms the copy image on paper. In this embodiment, an MFP, i.e., a multifunctional digital image processing apparatus having printer function, copier function, facsimile function, scanner function, and other functions, as described above, is employed as the image processing apparatus 1. Hereinafter, image processing apparatuses will also be referred to as "MFPs".

The portable terminal apparatus 2 is a portable computer terminal such as a tablet computer or a smartphone, essentially provided with a CPU, a RAM, a fixed storage device (a hard disk drive, for example), a monitor, and a touch-enabled liquid-crystal display panel. Users can carry their own portable terminal apparatuses 2 with them to view and edit electronic documents stored thereon anywhere. The portable terminal apparatus 2 is further provided with a wireless communication means such that the portable terminal apparatus 2 can exchange data with the MFP 1 and transmit print data to the MFP 1 to have it printed. Hereinafter, portable terminal apparatuses will also be referred to as "portable terminals" for the sake of simplicity.

Figure 2:
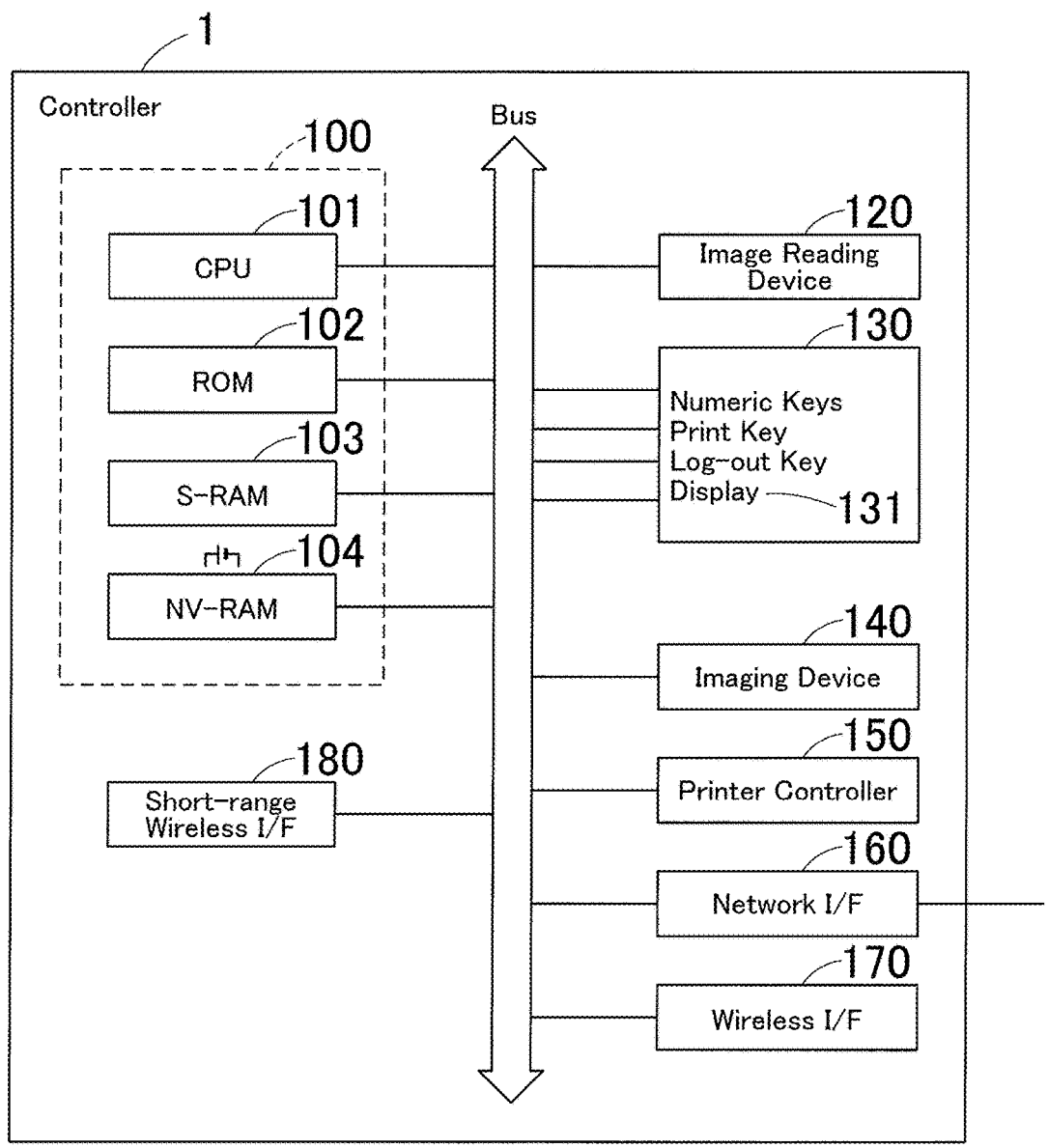
FIG. 2 illustrates an internal configuration of the image processing apparatus.

FIG. 2 illustrates an internal structure of the MFP 1. The MFP 1 is provided with a controller 100 that controls the MFP 1 in a unified and systematic manner. The controller 100 is composed of: a CPU 101; a ROM 102 that stores control programs; a static random access memory (S-RAM) 103 for fast processing; and a battery-backed non-volatile memory (NV-RAM) 104 that stores various settings for image forming, all of which are connected to each other through a bus network.

The controller 100 is connected to the following portions through a bus network: an image reading device 120 for document scanning; an operation panel 130 having a display 131 and various operation keys such as numeric keys, a print key, and a log-out key; a network interface (network I/F) 160 that exchanges various pieces of information with external apparatuses including personal computers (PCs) connected to the image processing apparatus 1 through the network; a printer controller 150 that generates a copy image from print data received by the network interface 160; and an imaging device 140 that forms the copy image on paper.

The controller 100 is further connected to a fixed storage device 110 through the bus network. The fixed storage device 110 is a hard disk drive, for example. The fixed storage 110 stores data of various types.

The image processing apparatus 1 is further provided with a wireless interface (wireless I/F) 170 that is connected to the fixed storage device 110 through the bus network. The wireless interface 170 serves for wireless communications with networks and with the portable terminal apparatus 2.

The MFP 1 prints a file created on a PC application and an electronic document from a storage by its printer function. There are various print instruction methods as introduced below. In a method, a printer driver or printing application installed on a client PC transmits a print instruction to the MFP 1 along with a specified print mode. In another method, a mailer installed on a client PC or the portable terminal 2 attaches a document file to an email message having a description of a specified print mode and transmits a print instruction by transmitting the email message (email to print). In yet another method, an OS standard printing application (e.g., AIRPRINT for IOS, AIRPRINT for MAC OS, or MOPRIA PLUG-IN for ANDROID) transmits a print instruction to the MFP 1. The MFP 1 has various network ports and protocols available for its printer function. Here, AIRPRINT or MOPRIA PLUG-IN transmits a print instruction using internet printing protocol (IPP).

IPP serves for authentication of a protocol. Receiving a connection request using a protocol, the MFP 1 performs authentication of the protocol to judge whether or not to permit a connection. Authentication of a protocol serves for the judgement whether or not to permit a connection, but never serves for user identification.

Figure 3:
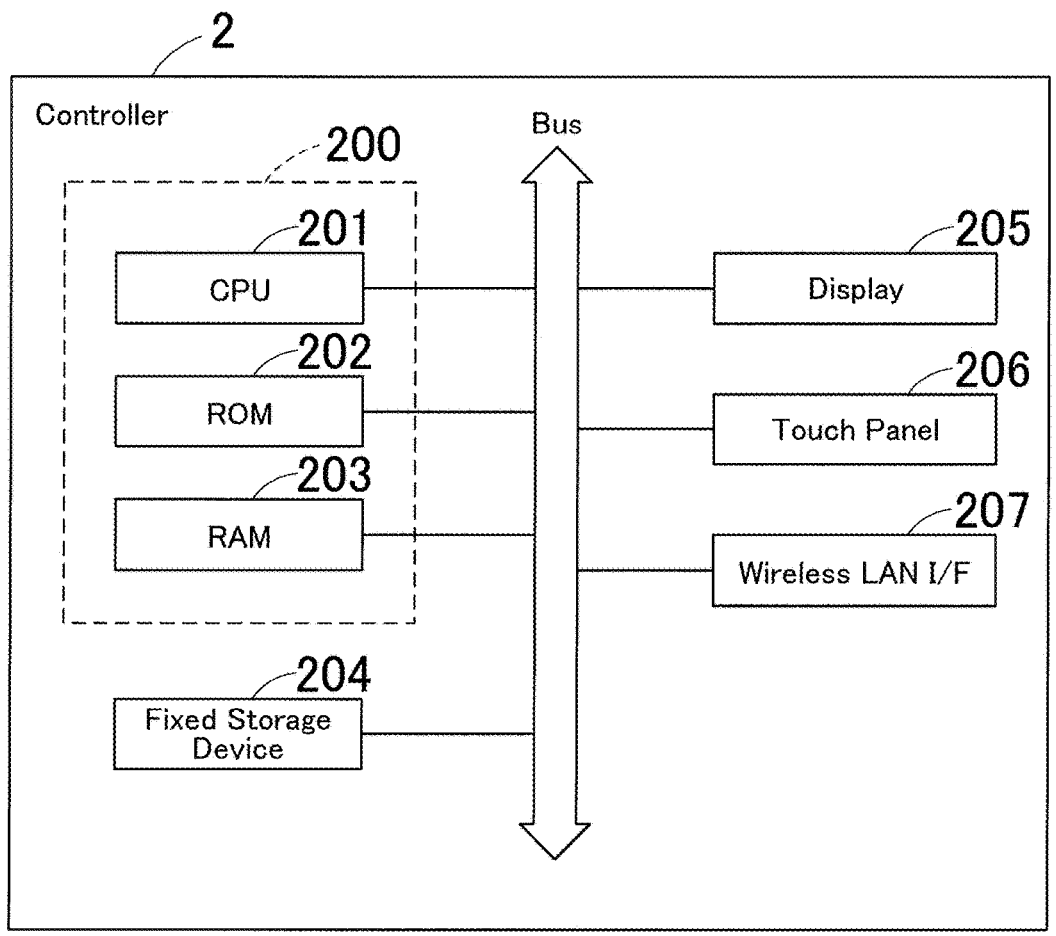
FIG. 3 is a block diagram illustrating a configuration of a portable terminal apparatus.

FIG. 3 is a block diagram illustrating a configuration of the portable terminal 2. The portable terminal apparatus 2 is provided with a CPU 201, a ROM 202 that stores control programs, and a RAM 203 for fast processing. The ROM 202 and the RAM 203 are connected to the CPU 201 through a bus network. The CPU 201, the ROM 202, and the RAM 203 constitute a controller 200 that controls the portable terminal 2 in a unified and systematic manner.

The controller 200 is connected to the following portions through a bus network: a display 205 that is a liquid-crystal display, for example, and that displays information of various types; a touch panel 206 that is disposed on the surface of the display 205 and that allows users to operate by physically touching a screen on the display; and a wireless LAN interface 207. The wireless LAN interface 207 serves for wireless communications with networks and with the MFP 1.

The controller 200 is further connected to a fixed storage device 204 is through the bus network. The fixed storage device 204 is a hard disk drive, for example. The fixed storage device 204 stores data of various types.

The MFP 1 performs operations as described below when receiving a request for a connection using IPP (to be also referred to as "IPP connection request") from AIRPRINT or MOPRIA PLUG-IN installed on the portable terminal 2. OS standard printing applications installed on the portable terminal 2 are designed to transmit an IPP connection request, and IPP connection requests do not require user identification.

Figure 4:
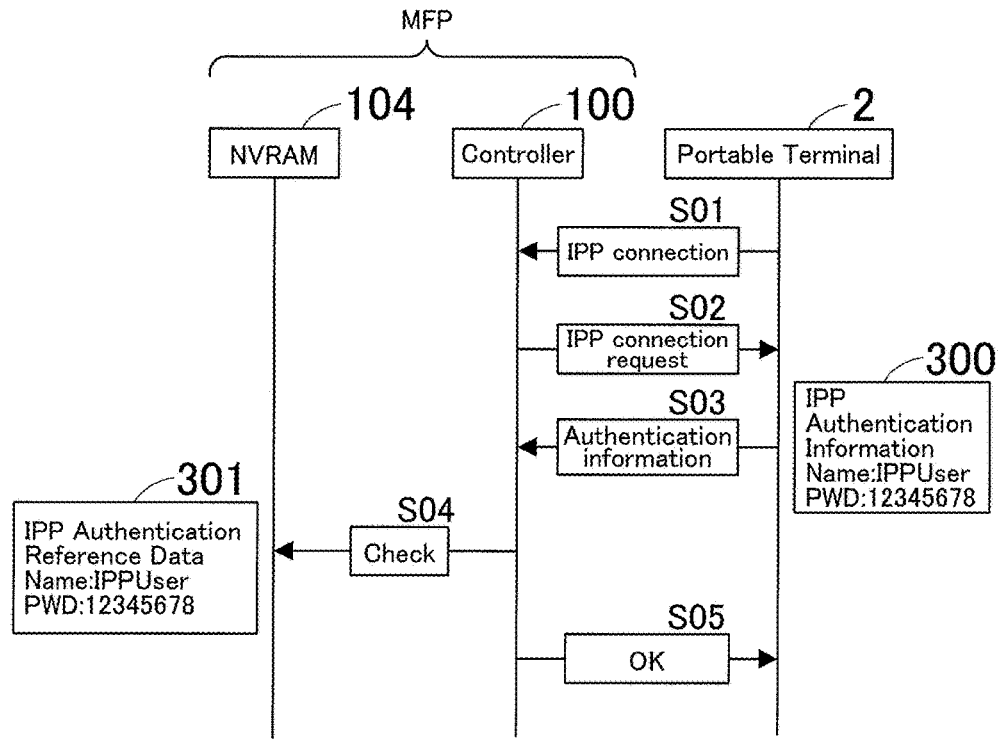
FIG. 4 illustrates an example of the conventional operations to be performed by the image processing apparatus and the portable terminal apparatus when the image processing apparatus receives a connection request from the portable terminal apparatus.

FIG. 4 illustrates an example of the conventional operations to be performed by the MFP 1 and the portable terminal 2 when the MFP 1 receives an IPP connection request from the portable terminal 2.

The controller 100 of the MFP 1 receives an IPP connection request from the portable terminal 2 (Step S01) and returns a request for information for IPP authentication (hereinafter to be referred to as "IPP authentication information") to the portable terminal 2 (Step S02).

A user of the portable terminal 2 transmits fixed IPP authentication information 300 that consists of a predetermined user name and password, to the MFP 1 (Step S03). The controller 100 performs IPP authentication by comparing the IPP authentication information 300 received from the portable terminal 2 to IPP authentication reference data 301 stored on a recording medium such as the NV-RAM 104 (Step S04). If it matches the data as a result of comparison, IPP authentication is successfully completed. The controller 100 then permits a connection with the portable terminal 2 (Step S05). In this example, the MFP 1 cannot manage the authorized activities of the user because the IPP authentication information does not include user identification information or other information serving for the judgment whether or not it is an authenticated user.

The user of the portable terminal 2 may accidentally transmit user authentication information including his/her user identification information, instead of the IPP authentication information 300. In this case, the MFP 1 denies an IPP connection because it does not match the IPP authentication reference data 301.

Figure 5:
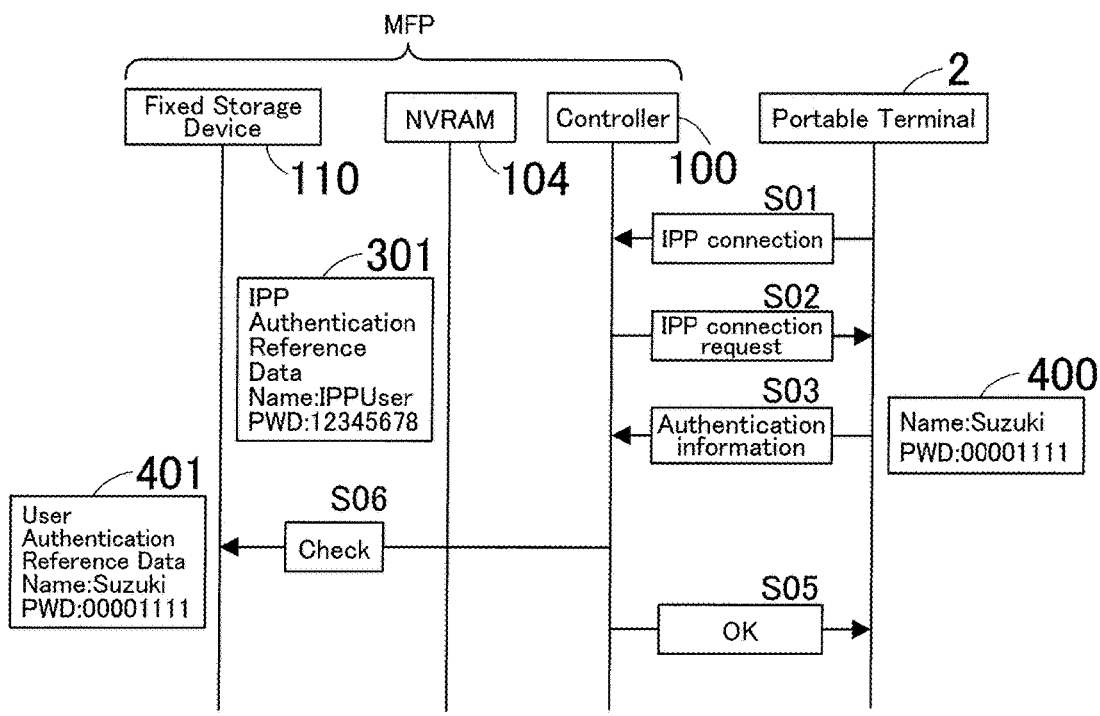
FIG. 5 illustrates an example of the operations to be performed by the image processing apparatus and the portable terminal apparatus according to this embodiment when the image processing apparatus receives a connection request from the portable terminal apparatus.

FIG. 5 illustrates an example of the operations to be performed by the MFP 1 and the portable terminal 2 according to this embodiment when the MFP 1 receives an IPP connection request from the portable terminal 2. In this example, the MFP 1 is already configured by an administrator-privileged user not to compare authentication information received from the portable terminal 2 to the IPP authentication reference data 301, that is, not to perform IPP authentication (IPP authentication is disabled). In other words, the MFP 1 is configured to perform user authentication by comparing authentication information received from the portable terminal 2 to user authentication reference data 401 for user identification.

Referring to FIG. 5, the controller 100 of the MFP 1 receives an IPP connection request from the portable terminal 2 (Step S01) and returns a request for IPP authentication information to the portable terminal 2 (Step S02).

A user of the portable terminal 2 transmits user authentication information 400 including his/her user identification information and password, instead of the fixed IPP authentication information 300, to the MFP 1 (Step S03). The controller 100 compares the user authentication information 400 received therefrom to user authentication reference data 401 stored on a recording medium such as the fixed storage device 110 (Step S06). That is, the controller 100 performs user authentication. If it matches the data as a result of comparison, authentication is successfully completed. The controller 100 then permits a connection with the portable terminal 2 (Step S05). In this example, the MFP 1 performs user identification and judges whether or not it is an authenticated user. So, the MFP 1 is able to manage the authorized activities of the user.

As described above, in this embodiment, the MFP 1 transmits a request for IPP authentication information to the portable terminal 2 in response to an IPP connection request, but the MFP 1 may accidentally receive user authentication information from the portable terminal 2. Even in this case, the MFP 1 performs user authentication using this user authentication information. So, the MFP 1 is able to manage the authorized activities of the user.

In the example of FIG. 5, the user of the portable terminal 2 may accidentally transmit the IPP authentication information 300. In this case, the MFP 1 compares the IPP authentication information 300 to the user authentication reference data 401. Since it does not match the data, the MFP 1 denies a connection with the portable terminal 2.

Figure 6:
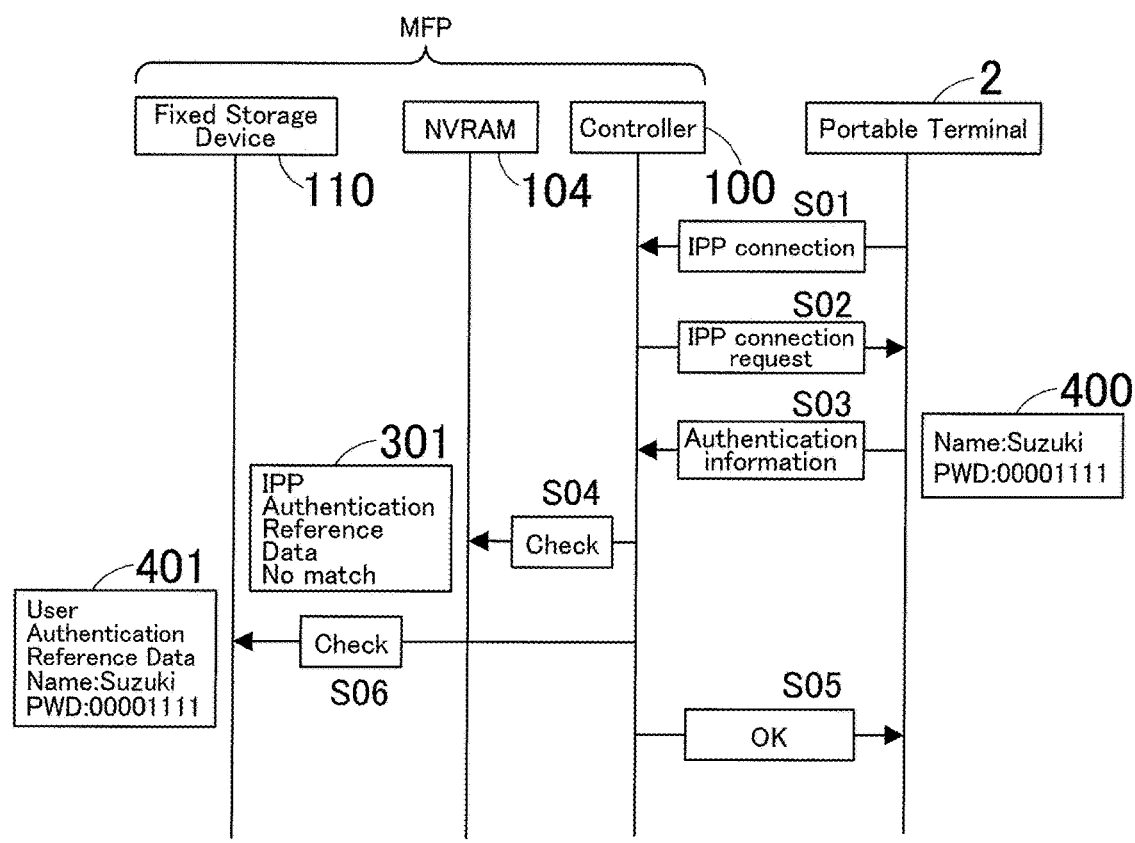
FIG. 6 illustrates another example of the operations to be performed by the image processing apparatus and the portable terminal apparatus according to this embodiment when the portable terminal apparatus transmits a connection request to the image processing apparatus.

FIG. 6 illustrates another example of the operations to be performed by the MFP 1 and the portable terminal 2 according to this embodiment when the MFP 1 receives a connection request from the portable terminal 2. In this example, the MFP 1 cannot perform IPP authentication because of absence of the IPP authentication reference data 301. In other words, IPP authentication is disabled. Also in this example, the MFP 1 is configured to perform user authentication by comparing authentication information received from the portable terminal 2 to the user authentication reference data 401.

Referring to FIG. 6, the controller 100 of the MFP 1 receives an IPP connection request from the portable terminal 2 (Step S01) and returns a request for IPP authentication information to the portable terminal 2 (Step S02).

A user of the portable terminal 2 transmits the user authentication information 400 including his/her user identification information and password, instead of the fixed IPP authentication information 300, to the MFP 1 (Step S03). The controller 100 fails to compare the user authentication information 400 received therefrom to the IPP authentication reference data 301 (Step S04) because of absence of the IPP authentication reference data 301. The controller 100 then compares the same to the user authentication reference data 401 (Step S06). If it matches the data as a result of comparison, authentication is successfully completed. The controller 100 then permits a connection with the portable terminal 2 (Step S05). Also in this example, the MFP 1 judges whether or not it is an authenticated user. So, the MFP 1 is able to manage the authorized activities of the user.

As described above, also in the embodiment of FIG. 6, the MFP 1 transmits a request for IPP authentication information to the portable terminal 2 in response to an IPP connection request, but the MFP 1 may accidentally receive user authentication information from the portable terminal 2. Even in this case, the MFP 1 performs user authentication using this user authentication information. So, the MFP 1 is able to manage the authorized activities of the user.

Figure 7:
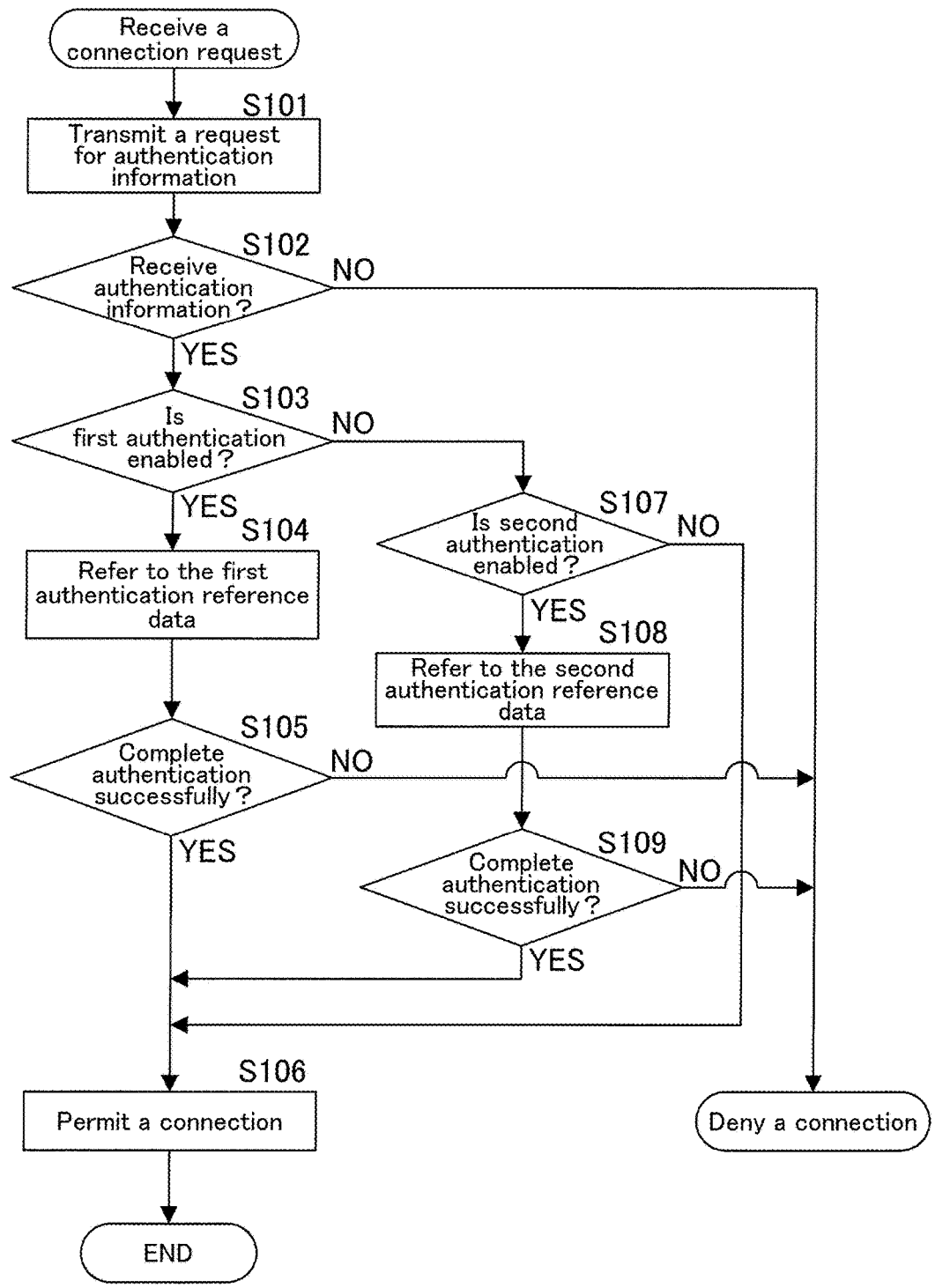
FIG. 7 is a flowchart representing the operations of the image processing apparatus, described in the embodiment of FIGS. 5 and 6.

FIG. 7 is a flowchart representing the operations of the MFP 1, described in the embodiment of FIGS. 5 and 6. The MFP 1 performs the operations represented by the FIG. 7 flowchart and the following flowcharts, by the CPU 101 running operation programs stored on a recording medium such as the ROM 12.

In Step S101, a request for IPP authentication information is transmitted from the MFP 1 to the portable terminal 2. In Step S102, it is judged whether or not authentication information is received. If authentication information is not received (NO in Step S102), a connection with the portable terminal 2 is denied.

If authentication information is received (YES in Step S102), it is then judged in Step S103 whether or not IPP authentication (hereinafter to be also referred to as "first authentication") is enabled, i.e., whether or not first authentication is enabled. If it is enabled (YES in Step S103), the authentication information received from the portable terminal 2 is compared to the IPP authentication reference data (hereinafter to be also referred to as "first authentication reference data") 301 in Step S104. In Step S105, it is judged whether or not authentication is successfully completed.

If authentication is successfully completed (YES in Step S105), a connection with the portable terminal 2 is permitted in Step S106. If authentication is not completed successfully (NO in Step S105), a connection with the portable terminal 2 is denied.

Back to Step S103, first authentication may be disabled (NO in Step S103). In other words, first authentication may be disabled or may not be possible because of absence of the first authentication reference data 301. In this case, the flowchart proceeds to Step S107, in which it is judged whether or not user authentication (hereinafter to be also referred to as "second authentication") for the judgment whether or not it is an authenticated user of the image processing apparatus, is enabled If second authentication is enabled (YES in Step S107), the authentication information received from the portable terminal 2 is compared to the user authentication reference data 401 in Step S108. In Step S109, it is judged whether or not authentication is successfully completed.

If authentication is successfully completed (YES in Step S109), a connection with the portable terminal 2 is permitted in Step S106. If authentication is not completed successfully (NO in Step S109), a connection with the portable terminal 2 is denied.

Back to Step S107, if user authentication is disabled (NO in Step S107), the MFP 1 does not require authentication. In Step S106, a connection with the portable terminal 2 is permitted accordingly.

Back to Step S105 of FIG. 7, if IPP authentication is not completed successfully (NO in Step S105), the flowchart may proceed to Step S107 for user authentication. As in the case where IPP authentication is disabled, the MFP 1 transmits a request for IPP authentication information to the portable terminal 2 in response to an IPP connection request, but the MFP 1 may accidentally receive the authentication information 400 including user information of the user of the portable terminal 2. Even in this case, the MFP 1 performs user authentication using this authentication information 400. So, the MFP 1 is able to manage the authorized activities of the user.

Figure 8:
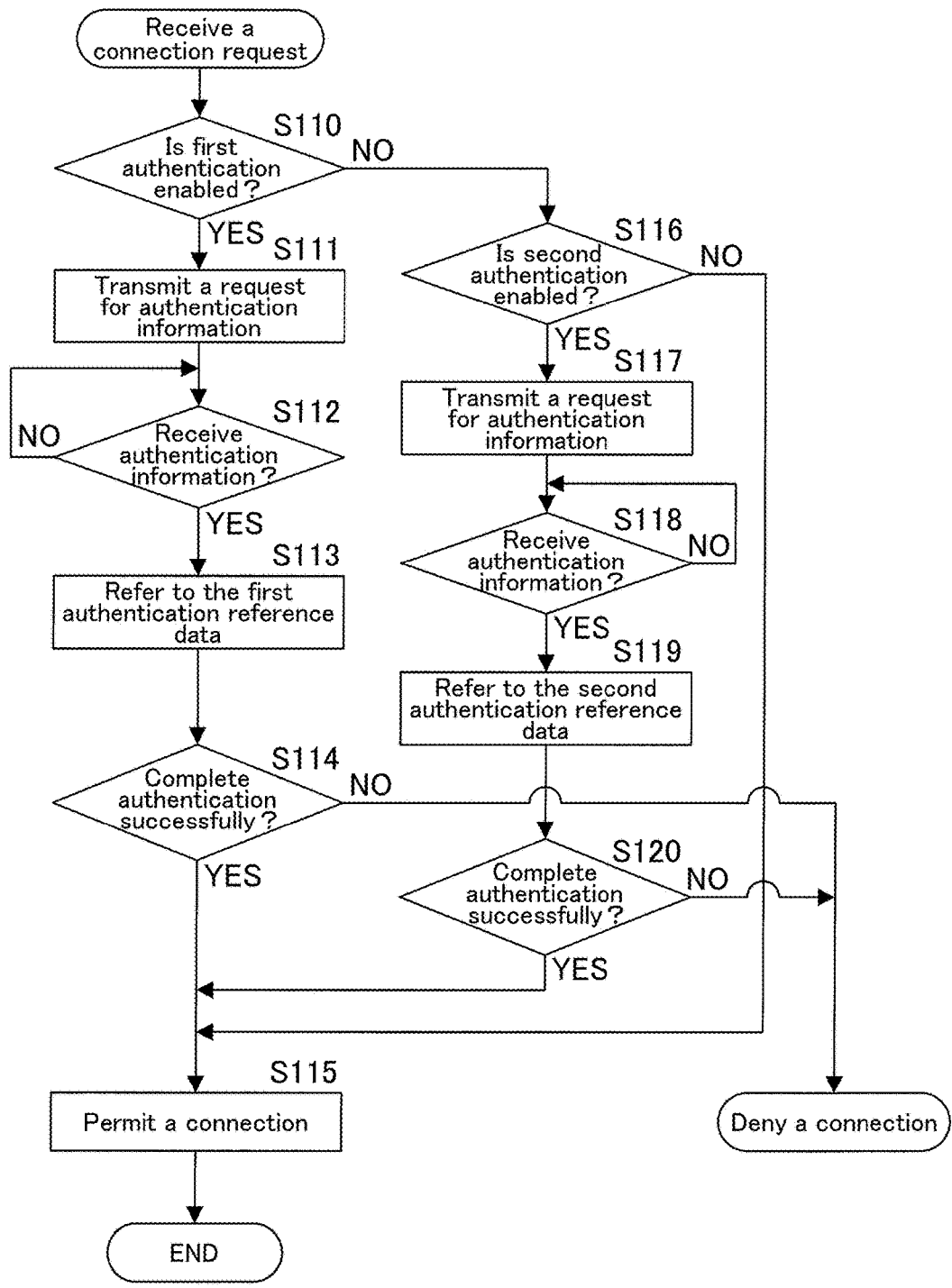
FIG. 8 is a flowchart representing a variation of the operations described in the embodiment of FIG. 7.

FIG. 8 is a flowchart representing a variation of the operations described in the embodiment of FIG. 7. In the example of FIG. 7, the MFP 1 is configured to judge whether or not user authentication is enabled after transmitting a request for IPP authentication information to the portable terminal 2. In contrast, in the example of FIG. 8, the MFP 1 is configured to transmit a request for IPP authentication information to the portable terminal 2 after judging whether or not IPP authentication or user authentication is enabled.

In Step S110, it is judged whether or not first authentication (IPP authentication) is enabled. If it is enabled (YES in Step S110), a request for IPP authentication information is transmitted in Step S111. In Step S102, it is judged whether or not authentication information is received. If authentication information is not received (NO in Step S112), the MFP 1 waits until it is received. If it is received (YES in Step S112, the authentication information received from the portable terminal 2 is compared to the first authentication reference data 301 in Step S113. In Step S114, it is judged whether or not authentication is successfully completed.

If authentication is successfully completed (YES in Step S114), a connection with the portable terminal 2 is permitted in Step S115. If authentication is not completed successfully (NO in Step S114), a connection with the portable terminal 2 is denied.

Back to Step S110, if first authentication is disabled (NO in Step S110), it is then judged in Step S116 whether or not second authentication (user authentication) is enabled.

If second authentication is enabled (YES in Step S116), a request for IPP authentication information is transmitted in Step S117. In Step S118, it is judged whether or not authentication information is received. If authentication information is not received (NO in Step S118), the MFP 1 waits until it is received. If it is received (YES in Step S118), the authentication information received from the portable terminal 2 is compared to the second authentication reference data 401 in Step S119. In Step S120, it is judged whether or not authentication is successfully completed.

If authentication is successfully completed (YES in Step S120), a connection with the portable terminal 2 is permitted in Step S115. If authentication is not completed successfully (NO in Step S120), a connection with the portable terminal 2 is denied.

Back to Step S116, if second authentication is disabled (NO in Step S116), the MFP 1 does not require authentication. In Step S115, a connection with the portable terminal 2 is permitted accordingly.

Back to Step S114 of FIG. 8, if first authentication is not completed successfully (NO in Step S114), the flowchart may proceed to Step S116 for second authentication, as in the embodiment of FIG. 7.

Figure 9:
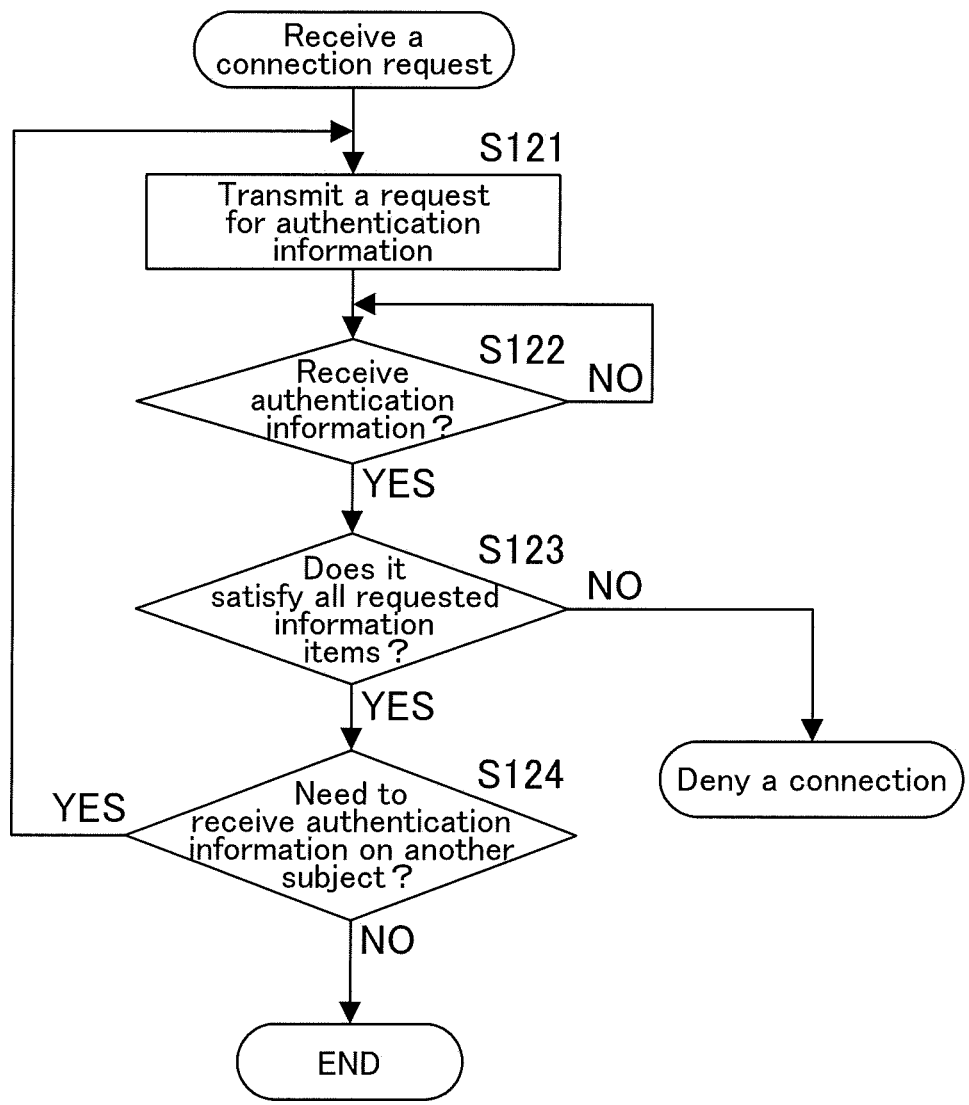
FIG. 9 relates to another embodiment of the present invention, illustrating a flowchart representing operations of the image processing apparatus.

FIG. 9 relates to another embodiment of the present invention, illustrating a flowchart representing operations of the MFP 1. In this embodiment, the MFP 1 is configured to perform authentication of different subjects. For example, the MFP 1 may be configured to perform user authentication after a successful completion of IPP authentication. For another example, the MFP 1 may be configured to further perform department authentication after IPP authentication and user authentication. In whichever case, after a successful completion of authentication of a subject, the MFP 1 transmits a request for authentication information on another subject. The MFP 1 transmits such a request repeatedly until completing authentication of all subjects.

In Step S121, a request for authentication information is transmitted. In Step S122, it is judged whether or not authentication information is received. If it is not received (NO in Step S122), the MFP 1 waits until it is received. If it is received (YES in Step S122), authentication of an initial subject is performed in Step S123 by judging whether or not it satisfies all requested elements. For example, it may be lacking in a password. If it does not satisfy all requested elements (NO in Step S123), a connection with the portable terminal 2 is denied.

If it satisfies all requested elements (YES in Step S123), authentication is successfully completed. In Step S124, it is further judged whether or not authentication information on another subject needs to be received. If authentication information on another subject needs to be received (YES in Step S124), the flowchart returns to Step S121 in which a request for authentication information on another subject is transmitted. If authentication information on another subject do not need to be received (NO in Step S112), in other words, if authentication information on all subjects are already received, the authentication process is terminated.

Figure 10:
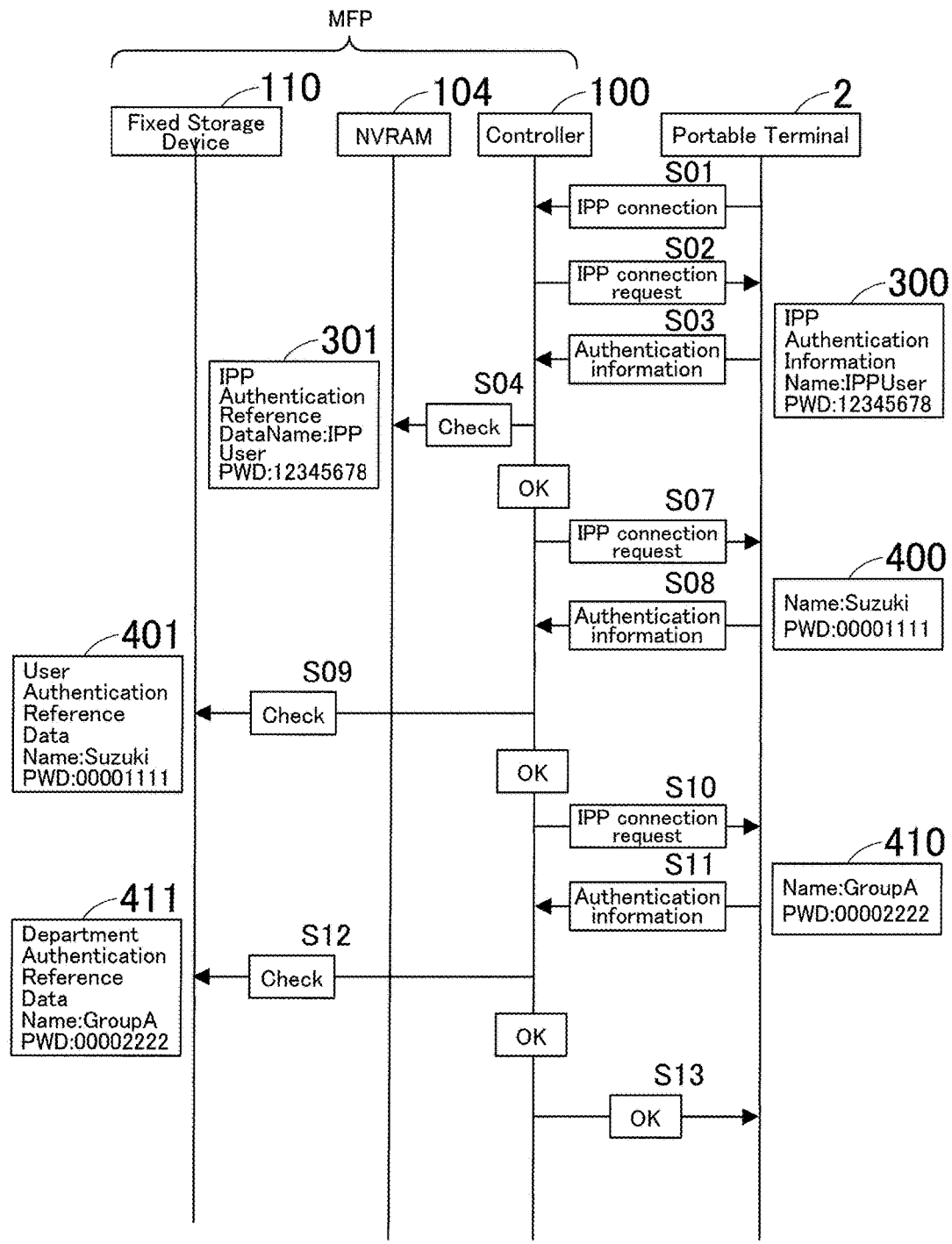
FIG. 10 is an explanatory diagram of the authentication of multiple subjects, to be performed by the image processing apparatus and the portable terminal apparatus according to this embodiment when the image processing apparatus receives a connection request from the portable terminal apparatus.

FIG. 10 is an explanatory diagram of the authentication of multiple subjects, to be performed by the MFP 1 and the portable terminal 2 according to this embodiment when the MFP 1 receives a connection request from the portable terminal 2.

In this embodiment, the MFP 1 is configured to perform user authentication and department authentication under the condition of a successful completion of IPP authentication.

The controller 100 of the MFP 1 receives an IPP connection request from the portable terminal 2 (Step S01) and returns a request for IPP authentication information to the portable terminal 2 (Step S02).

A user of the portable terminal 2 transmits the fixed IPP authentication information 300 to the MFP 1 (Step S03). The controller 100 performs first authentication (IPP authentication) by comparing the IPP authentication information 300 received therefrom to the first authentication reference data 301 (Step S04). If it matches the data as a result of comparison, first authentication is successfully completed. The MFP 1 then transmits a request for other IPP authentication information serving for user authentication coming next, to the portable terminal 2 (Step S07).

The user of the portable terminal 2 transmits the user authentication information 400 including his/her user identification information and password to the MFP 1 (Step S08). The controller 10 compares the user authentication information 400 received therefrom to the second authentication reference data 401 (Step S09). That is, the controller 100 performs second authentication (user authentication). If it matches the data as a result of comparison, authentication is successfully completed. The MFP 1 then transmits a request for other IPP authentication information serving for department authentication coming next, to the portable terminal 2 (Step S10).

The user of the portable terminal 2 transmits department authentication information 410 including his/her department identification information and password to the MFP 1 (Step S11). The controller 10 compares the department authentication information 410 received from the portable terminal 2 to department authentication reference data 411 (Step S12). That is, the controller 100 performs department authentication. If it matches the data as a result of comparison, authentication is successfully completed. The controller 100 then permits a connection with the portable terminal 2 (Step S13).

As described above, after a successful completion of authentication of a subject, the MFP 1 transmits a request for IPP authentication information on another subject. Using authentication information received from the portable terminal 2, the MFP 1 performs user authentication and authentication of other subjects.

In FIG. 10, the MFP 1 may be configured to skip IPP authentication and perform only user authentication and department authentication in order.

Print data received from a printer driver or printing application suitable for the MFP 1 includes user identification information described in PJL. In contrast, as described above, print data received from an OS standard printing application such as AIRPRINT or MORPIA PLUG-IN does not include user identification information or department information because OS standard printing applications installed on the portable terminal 2 are designed to transmit a request for a connection using IPP to the MFP 1. OS standard printing apparatus have multiple protocols workable for establishing a connection with the MFP 1, including a specific protocol just like IPP. To solve this problem, for example, the MPF 1 may be configured to transmit a request for IPP authentication information to the portable terminal 2 only when receiving a connection request using IPP from the portable terminal 2, and to perform user authentication or department authentication using IPP authentication information received therefrom.

Figure 11:
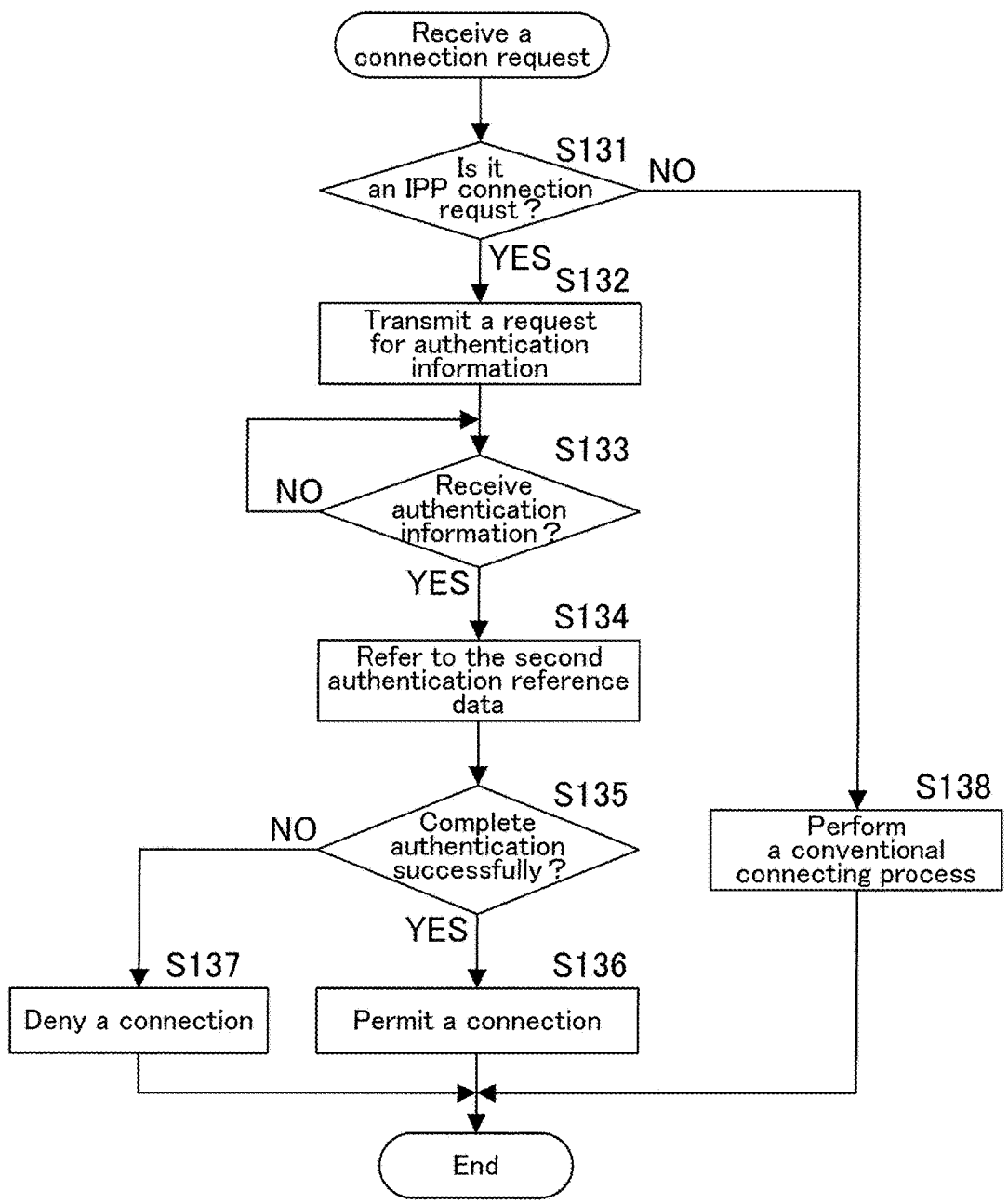
FIG. 11 is a flowchart representing the authentication using IPP authentication information received from the portable terminal apparatus, to be performed by the image processing apparatus only when receiving a request for a connection using IPP from the portable terminal apparatus.

FIG. 11 is a flowchart representing the user authentication or department authentication using IPP authentication information received from the portable terminal 2, to be performed by the MFP 1 only when receiving a request for a connection using IPP from the portable terminal 2.

In Step S131, it is judged whether or not it is an IPP connection request. If it is an IPP connection request (YES in Step S131), a request for IPP authentication information is transmitted in Step S132. In Step S133, it is judged whether or not authentication information is received. If it is not received (NO in Step S133), the MFP 1 waits until it is received. If it is received (YES in Step S133), it is compared to the user authentication reference data 401 in Step S134. In Step S135, it is judged whether or not authentication is successfully completed.

If authentication is successfully completed (YES in Step S135), a connection with the portable terminal 2 is permitted in Step S136. If authentication is not completed successfully (NO in Step S135), a connection with the portable terminal 2 is denied in Step S137.

Back to Step S131, if it is not an IPP connection request (NO in Step S131), a conventional connecting process using other protocols than IPP is executed in Step S138.

Hereinafter, yet another embodiment of the present invention will be described. In this embodiment, one piece of authentication information consists of multiple elements of authentication information according to a predetermined rule, and the MFP 1 is configured to extract the elements of authentication information therefrom and perform authentication of different subjects using the elements of authentication information.

Figure 12:
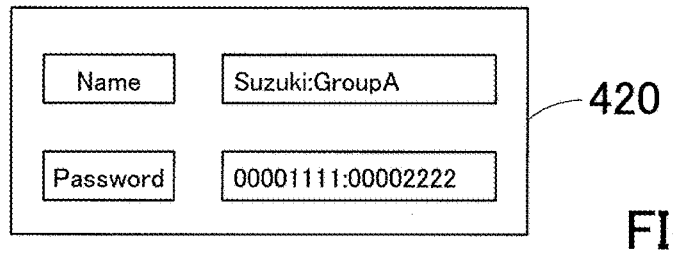
FIG. 12 indicates one piece of authentication information that consists of multiple elements of authentication information.

FIG. 12 indicates one piece of authentication information 420 that consists of multiple elements of authentication information. The authentication information 420 consists of a user name (as "Name" in this figure) and password (as "Password" in this figure). The user name and password each contains multiple elements of authentication information.

Specifically, the user name contains elements of authentication information "Suzuki" and "GroupA", which are joined together by a punctuation mark ":" that is a predetermined combinator. Similarly, the password contains elements of authentication information "00001111" and "00002222", which are also joined together by a punctuation mark ":" that is predetermined combinator. The MFP 1 separates and extracts these elements of authentication information from the user name and password of the authentication information, and recognizes user identification information "Suzuki", its corresponding password "00001111", department information "GroupA", and its corresponding password "00002222". The MFP 1 then performs user authentication and department authentication using the elements of authentication information extracted therefrom.

Figure 13:
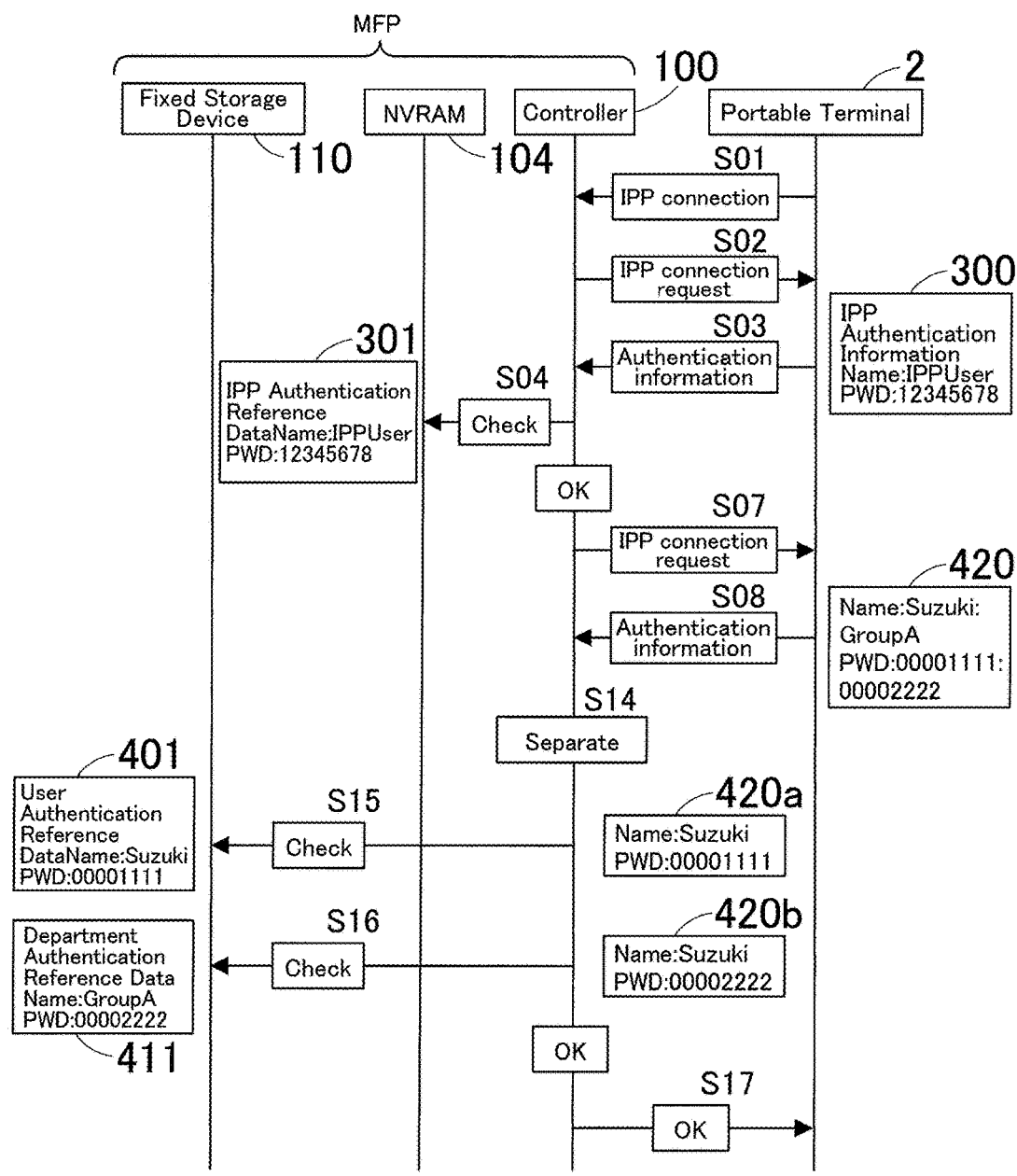
FIG. 13 is an explanatory diagram of the user authentication and department authentication using elements of authentication information separated and extracted from the authentication information of FIG. 12, to be performed by the image processing apparatus and the portable terminal apparatus.

FIG. 13 is an explanatory diagram of the user authentication and department authentication using elements of authentication information separated and extracted from the authentication information of FIG. 12, to be performed by the MFP 1 and the portable terminal 2.

The controller 100 of the MFP 1 receives an IPP connection request from the portable terminal 2 (Step S01) and returns a request for IPP authentication information to the portable terminal 2 (Step S02).

A user of the portable terminal 2 transmits the fixed IPP authentication information 300 to the MFP 1 (Step S03). The controller 100 performs IPP authentication by comparing the IPP authentication information 300 received therefrom to the IPP authentication reference data 301 (Step S04). If it matches the data as a result of comparison, IPP authentication is successfully completed. The MFP 1 then transmits a request for other IPP authentication information serving for user authentication coming next, to the portable terminal 2 (Step S07).

The user of the portable terminal 2 transmits the authentication information 420 that consists of multiple elements of authentication information as indicated in FIG. 12, to the MFP 1 (Step S08). Receiving the authentication information 420, the controller 100 separates the elements of authentication information therefrom and extracts user authentication information 420a that consists user identification information "Suzuki" and its corresponding password "00001111" and department authentication information 420b that consists of department authentication information "GroupA" and its corresponding password "00002222" (Step S14).

The MFP 1 perform user authentication by comparing the user authentication information 420a to the user authentication reference data 401 (Step S15), and performs department authentication by comparing the department authentication information 420b to the department authentication reference data 411 (Step S16). When user authentication and department authentication are both successfully completed as a result of completion, a connection with the portable terminal 2 is permitted (Step S17).

As described above, in this embodiment, one piece of authentication information consists of multiple elements of authentication information, and the MFP 1 separates and extracts the elements of authentication information therefrom and performs authentication of multiple subjects, without the need of transmitting a request for authentication information again and again. This will make the authentication process simpler.

Hereinafter, yet another embodiment of the present invention will be described. In this embodiment, one piece of authentication information consists of a title of authentication information and an element of authentication information according to a predetermined rule. The MFP 1 is configured to extract the title of authentication information and the element of authentication information therefrom and perform authentication of a subject indicated by the title of authentication information extracted therefrom.

Figure 14:
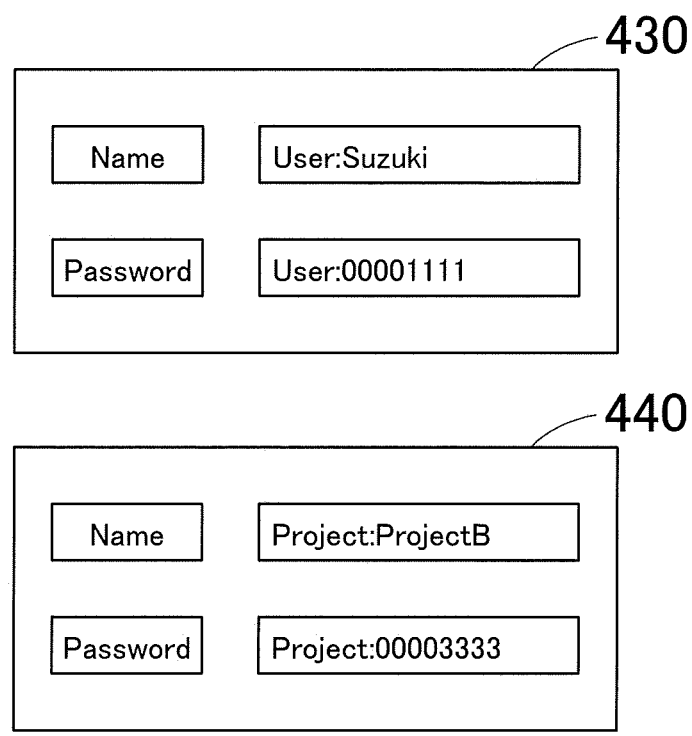
FIG. 14 indicates two pieces of authentication information that each consist of a title of authentication information and an element of authentication information.

FIG. 14 indicates two pieces of authentication information 430 and 440 that each consist of a title of authentication information and an element of authentication information. The authentication information 430 and 440 each consist of a user name (as "Name" in this figure) and password (as "Password" in this figure). The user name and password each contains a title of authentication information and an element of authentication information.

Specifically, as for the authentication information 430, the user name contains a title of authentication information "User" and an element of authentication information "Suzuki", which are joined together by a punctuation mark ":" that is a predetermined combinator. Similarly, the password contains a title of authentication information "User" and an element of authentication information "00001111", which are joined together also by a punctuation mark ":" that is a predetermined combinator.

The MFP 1 separates and extracts these titles and elements of authentication information from the authentication information 430, and recognizes a title of authentication "User" (user authentication), user identification information "Suzuki", and its corresponding password "00001111".

As for the authentication information 440, the user name contains a title of authentication information "Project" and an element of authentication information "ProjectB", which are joined together by a punctuation mark ":" that is a predetermined combinator. Similarly, the password contains a title of authentication information "Project" and an element of authentication information "00003333", which are joined together also by a punctuation mark ":" that is a predetermined combinator.

The MFP 1 separates and extracts these titles and elements of authentication information from the authentication information 440, and recognizes a title of authentication "Project" (project authentication), a project name "ProjectB", and its corresponding password as "00003333".

The MFP 1 then performs user authentication and project authentication using the titles and elements of authentication information extracted therefrom.

Figure 15:
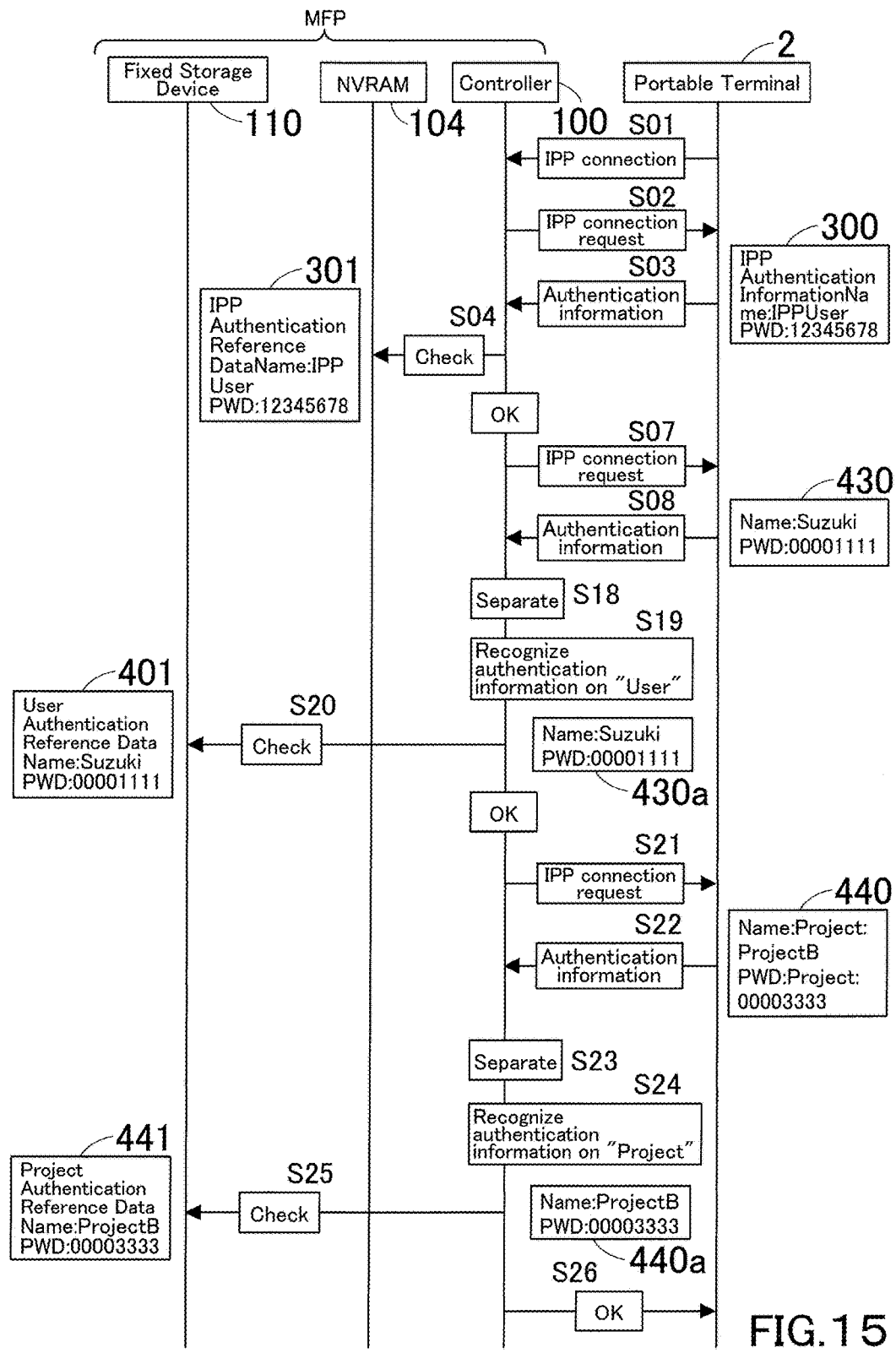
FIG. 15 is an explanatory diagram of the user authentication and project authentication using titles of authentication information and elements of authentication information separated and extracted from the two pieces of authentication information of FIG. 14, to be performed by the image processing apparatus and the portable terminal apparatus.

FIG. 15 is an explanatory diagram of the user authentication and project authentication using titles of authentication information and elements of authentication information separated and extracted from the authentication information of FIG. 14, to be performed by the MFP 1 and the portable terminal 2.

The controller 100 of the MFP 1 receives an IPP connection request from the portable terminal 2 (Step S01) and returns a request for IPP authentication information to the portable terminal 2 (Step S02).

A user of the portable terminal 2 transmits the fixed IPP authentication information 300 to the MFP 1 (Step S03). The controller 100 performs IPP authentication by comparing the IPP authentication information 300 received therefrom to the IPP authentication reference data 301 (Step S04). If it matches the data as a result of comparison, IPP authentication is successfully completed. The MFP 1 then transmits a request for other IPP authentication information serving for user authentication coming next, to the portable terminal 2 (Step S07).

In response to the request, the user of the portable terminal 2 transmits the authentication information 430 including a user name and password, i.e., a title and element of authentication information, as indicated in FIG. 14, to the MFP 1 (Step S08). The controller 100 separates the title and element of authentication information from the authentication information 430 received therefrom (Step S18). The controller 100 recognizes the authentication information 430 as user authentication information from the title of authentication information "User" (Step S19), and extracts authentication information 430a that consists of user identification information "Suzuki" and its corresponding password "00001111", from the authentication information 430.

The controller 100 then perform user authentication by comparing the authentication information 430a to the user authentication reference data 401 (Step S20). After a successful completion of authentication, the MFP 1 transmits a request for other IPP authentication information serving for next authentication (Step S21).

In response to the request, the user of the portable terminal 2 transmits the authentication information 440 that consists of a title and element of authentication information as indicated in FIG. 14, to the MFP 1 (Step S22). The controller 100 extracts the title and element of authentication information from the authentication information 440 received therefrom (Step S23). The controller 100 recognizes the authentication information 440 as project authentication information from the authentication information "Project" (Step S24), and extracts authentication information 440a that consists of a project name "ProjectB" and its corresponding password "00003333", from the authentication information 440.

The controller 100 then perform project authentication by comparing authentication information 440a to project authentication reference data 441 (Step S25). After a successful completion of authentication, the controller 100 permits a connection with the portable terminal 2 (Step S26).

As described above, in this embodiment, two pieces of authentication information each consist of a title and element of authentication information, and the MFP 1 separates and extracts the titles and elements of authentication information therefrom and perform authentication of multiple subjects using the elements of authentication information, without the need of presetting the order of authentication. This will make the authentication process simpler.

Figure 16:
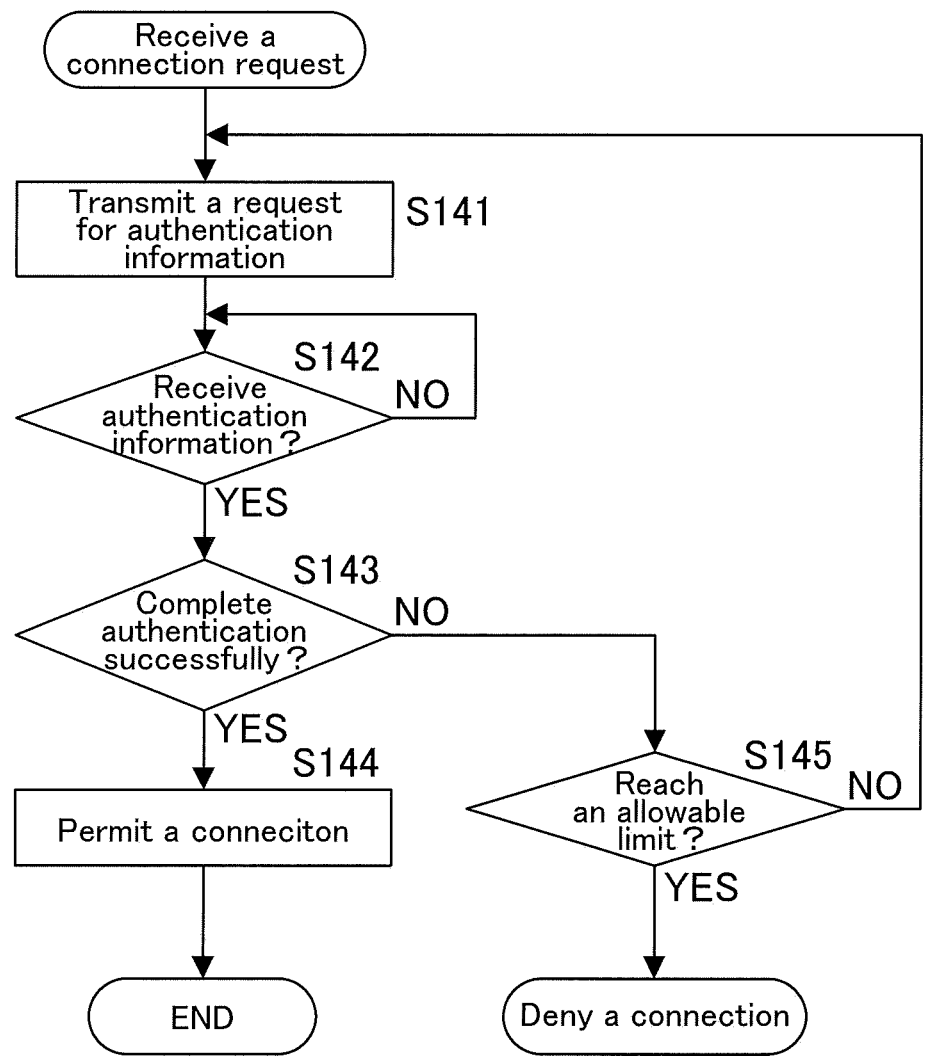
FIG. 16 relates to yet another embodiment of the present invention, illustrating a flowchart representing operations of the image processing apparatus.

FIG. 16 illustrates still yet another embodiment of the present invention, and is a flowchart representing operations of the MFP 1. In this example, the MFP 1 is configured to store a predetermined allowable limit of the number of user authentication failures and to transmit a request for IPP authentication information repeatedly until the number of authentication failures reaches the allowable limit.

In Step S141, a request for IPP authentication information is transmitted from the MFP 1 to the portable terminal 2. In Step S142, it is judged whether or not authentication information is received. If it is not received (NO in Step S142), the MFP 1 waits until it is received. If it is received (YES in Step S142), it is then judged in Step S143 whether or not authentication is successfully completed. If authentication is successfully completed (YES in Step S143), a connection with the portable terminal 2 is permitted in Step S144.

If authentication is not completed successfully (NO in Step S144), it is then judged in Step S145 whether or not the number of authentication failures reaches an allowable limit. If it does not reach an allowable limit yet (NO in Step S145), the flowchart returns to Step S141 in which a request for IPP authentication information is transmitted again. If it reaches an allowable limit (YES in Step S145), a connection with the portable terminal 2 is denied.

Figure 17:
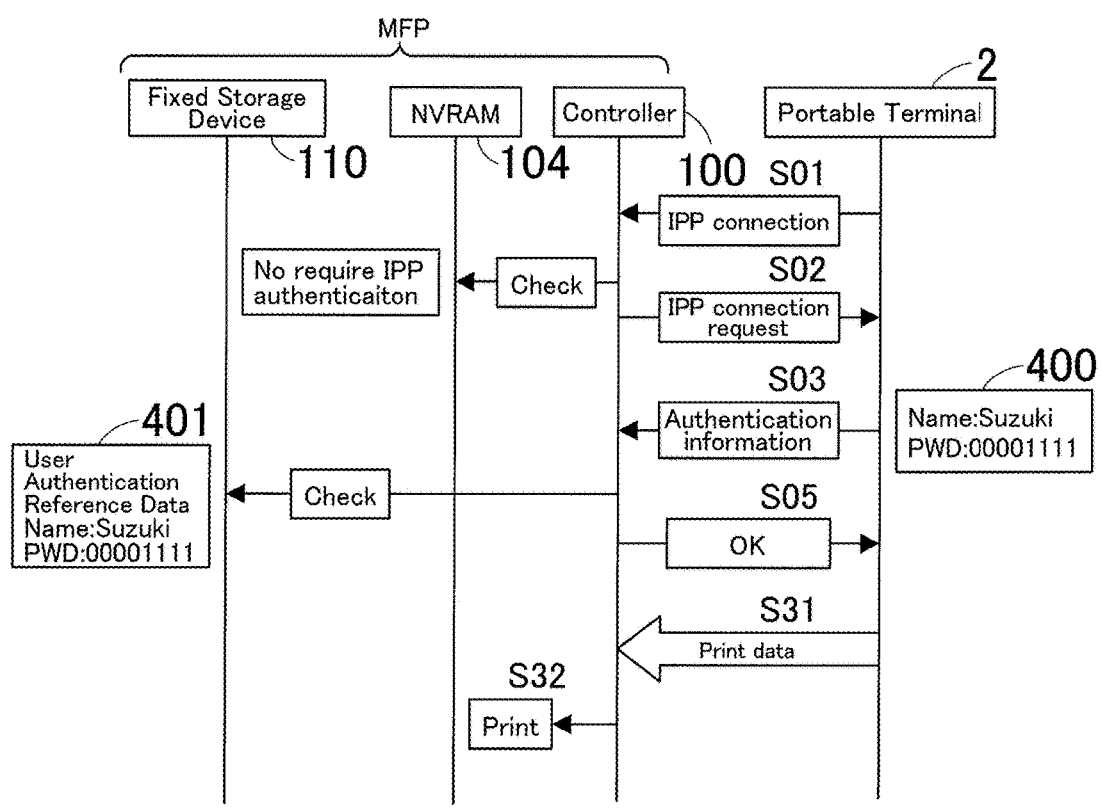
FIG. 17 is an explanatory diagram of the timing of when the portable terminal apparatus transmits print data.

As described above, in this embodiment, the portable terminal 2 returns authentication information in response to a request for IPP authentication information, and the MFP 1 performs user authentication, department authentication, and project authentication using the authentication information received therefrom. After a successful completion of authentication of all predetermined subjects, the portable terminal 2 transmits print data, as indicated in FIG. 17 (Step S31). The controller 100 of the MFP 1 receives the print data and makes the imaging device 140 perform printing (Step S32).

Figure 18:
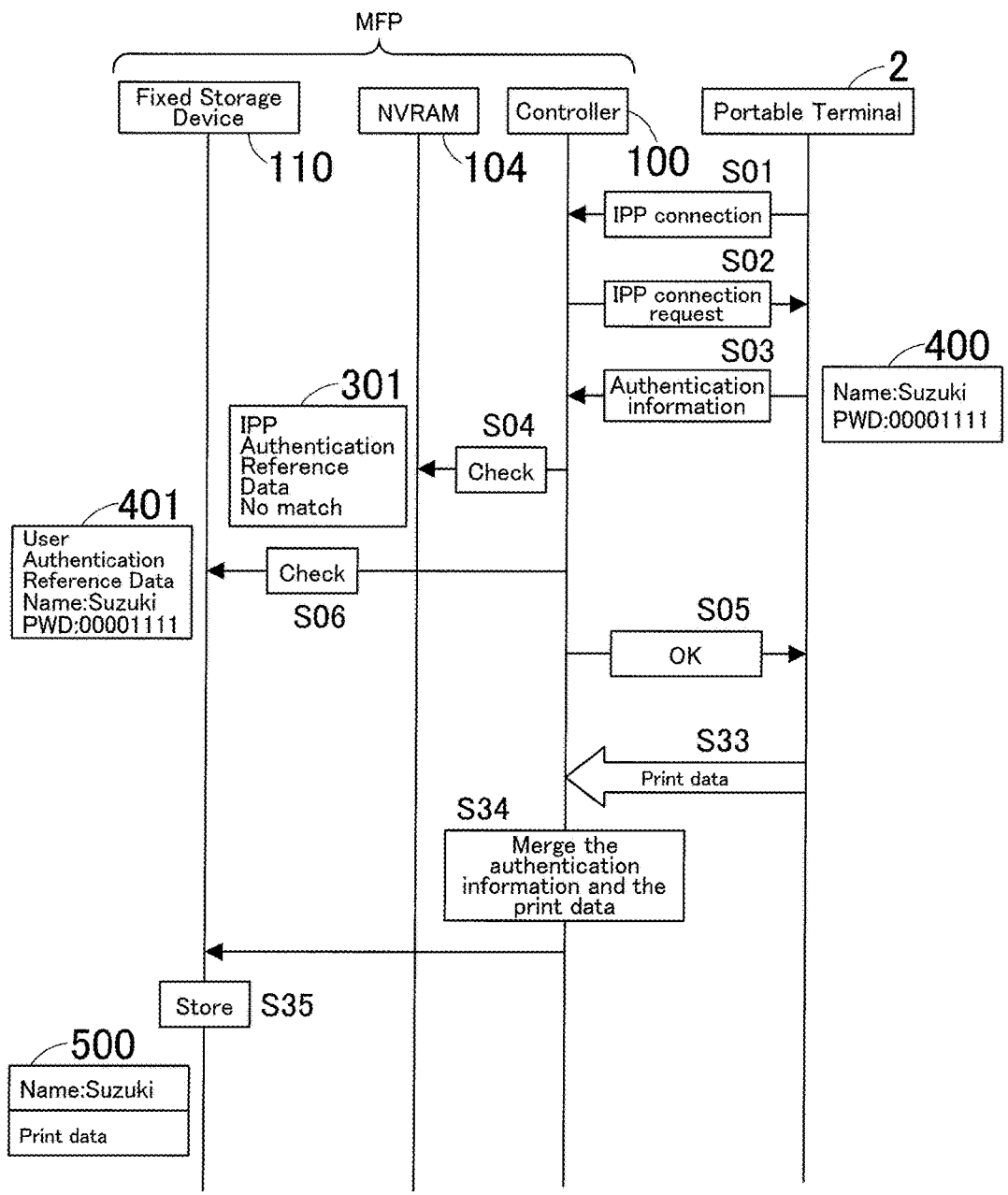
FIG. 18 indicates an example of the operations of consolidating the print data received from the portable terminal apparatus to the authentication information and store.

As referred to FIG. 18, after the portable terminal 2 transmits the print data (Step S33), the controller 100 of the MFP 1 may merge the print data and the authentication information of the relevant user into consolidated data 500 and store the consolidated data 500 on a recording medium such as the fixed storage device 110.

Here, a detailed description on Steps S01 to S05 of FIG. 6 is omitted because of these steps being the same as Steps S01 to S05 of FIG. 6.

Referring to FIGS. 17 and 18, the controller 100 of the MFP 1 may be further configured to judge whether or not a print job is an authorized activity of the user of the portable terminal 2 and to receive the print job only if it is one of the authorized activities of the user.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus comprising:
an authentication information requesting portion that transmits one or more requests for authentication information to a portable terminal apparatus upon receipt of an internet printing protocol (IPP) connection request from the portable terminal apparatus, wherein the IPP connection request is a request for a connection using IPP, the IPP connection request not requiring user identification, and wherein the portable terminal apparatus has an operating system (OS) configured to send a print job from the portable terminal apparatus to the image processing apparatus using IPP;
a first authentication portion that performs first authentication for the judgment whether or not to permit the IPP connection with the portable terminal apparatus, the first authentication not requiring user identification, by comparing authentication information to first reference data, the authentication information being received from the portable terminal apparatus in return for the request being transmitted by the authentication information requesting portion;

a second authentication portion that performs second authentication for the judgment whether or not it is an authenticated user of the image processing apparatus, by comparing the authentication information to second reference data for user identification; and a processor that takes one piece of authentication information or any one of multiple pieces of authentication information according to a predetermined rule, the one piece of authentication information or the multiple pieces of authentication information, respectively, being received from the portable terminal apparatus in return for the one or more requests, and that makes the second authentication portion perform the second authentication using the one piece of authentication information or the any one of the multiple pieces of authentication information being taken.

2. The image processing apparatus according to claim 1, wherein, when the first authentication portion completes the first authentication unsuccessfully using authentication information, the authentication information being received from the portable terminal apparatus, the processor then makes the second authentication portion perform the second authentication using the authentication information.

3. The image processing apparatus according to claim 1, wherein, when the first authentication portion is disabled, the processor then makes the second authentication portion perform the second authentication using authentication information, the authentication information being received from the portable terminal apparatus.

4. The image processing apparatus according to claim 1, wherein:

after the first authentication portion successfully completes the first authentication using authentication information, the authentication information being received from the portable terminal apparatus, the authentication information requesting portion transmits a request for next authentication information to the portable terminal apparatus; and the processor makes the second authentication portion perform the second authentication using next authentication information, the next authentication information being received from the portable terminal apparatus.

5. The image processing apparatus according to claim 4, wherein:

the second authentication portion needs to perform the second authentication of multiple subjects; and after the second authentication portion completes the second authentication of one subject, the authentication information requesting portion transmits a request for other next authentication information to be used for the second authentication of another subject.

6. The image processing apparatus according to claim 1, wherein:

the portable terminal apparatus transmits the IPP connection request using a specific protocol; and the first authentication portion performs the first authentication using authentication information, the authentication information being received using the specific protocol.

7. The image processing apparatus according to claim 1, wherein:

multiple protocols are workable for establishing the IPP connection with the portable terminal apparatus; and the processor makes the second authentication portion perform the second authentication only when the IPP connection with the portable terminal apparatus is established using one of the workable protocols, the one workable protocol being specific.

8. The image processing apparatus according to claim 1, wherein:

the authentication information consists of multiple elements of authentication information according to a predetermined rule; and the second authentication portion extracts the elements of authentication information therefrom and performs the second authentication of different subjects using the elements of authentication information extracted therefrom.

9. The image processing apparatus according to claim 1, wherein:

the authentication information consists of a title of authentication information and an element of authentication information according to a predetermined rule; and the second authentication portion extracts the title of authentication information and the element of authentication information therefrom and performs the second authentication of a subject using the element of authentication information extracted therefrom, the subject being indicated by the title of authentication information extracted therefrom.

10. The image processing apparatus according to claim 1, wherein, when the second authentication portion completes the second authentication unsuccessfully, the processor denies the IPP connection with the portable terminal apparatus.

11. The image processing apparatus according to claim 10, further comprising:

an allowable limit setting portion that determines an allowable limit of the number of authentication failures, the authentication failures to be made by the second authentication portion, wherein:

if the second authentication portion completes the second authentication unsuccessfully and the number of the authentication failures does not reach the allowable limit determined by the allowable setting portion, the authentication information requesting portion transmits a request for authentication information and the second authentication portion performs the second authentication using authentication information, the authentication information being received from the portable terminal apparatus in return for the request; or if the second authentication portion completes the second authentication unsuccessfully and the number of the authentication failures reaches the allowable limit, the processor denies the IPP connection with the portable terminal apparatus.

12. The image processing apparatus according to claim 1, wherein:

the second authentication portion judges whether or not a print job received from the portable terminal apparatus is an authorized activity of the user; and the second authentication portion comprises an accepting portion that accepts the print job only if the second authentication portion judges that the print job is an authorized activity of the user.

13. A non-transitory computer-readable recording medium storing an authentication program to make a computer of an image processing apparatus execute:
 transmitting one or more requests for authentication information to a portable terminal apparatus upon receipt of an internet printing protocol (IPP) connection request from the portable terminal apparatus, wherein the IPP connection request is a request for a connection using IPP, the IPP connection request not requiring user identification, and wherein the portable terminal apparatus has an operating system (OS) configured to send a print job from the portable terminal apparatus to the image processing apparatus using IPP;
 performing first authentication for the judgment whether or not to permit the IPP connection with the portable terminal apparatus, the first authentication not requiring user identification, by comparing authentication information to first reference data, the authentication information being received from the portable terminal apparatus in return for the request being transmitted;
 performing second authentication for the judgment whether or not it is an authenticated user of the image processing apparatus, by comparing the authentication information to second reference data for user identification; and
 taking one piece of authentication information or any one of multiple pieces of authentication information according to a predetermined rule, the one piece of authentication information or the multiple pieces of authentication information, respectively, being received from the portable terminal apparatus in return for the one or more requests, and performing the second authentication using the one piece of authentication information or the any one of the multiple pieces of authentication information being extracted being taken.

14. The non-transitory computer-readable recording medium according to claim 13, wherein, when the first authentication is completed unsuccessfully using authentication information, the authentication information being received from the portable terminal apparatus, the second authentication is performed using the authentication information.

15. The non-transitory computer-readable recording medium according to claim 13, wherein, when the first authentication is disabled, the second authentication is performed using authentication information, the authentication information being received from the portable terminal apparatus.

16. The non-transitory computer-readable recording medium according to claim 13, wherein:
 after the first authentication is successfully completed using authentication information, the authentication information being received from the portable terminal apparatus, a request for authentication information is transmitted to the portable terminal apparatus; and
 the second authentication is performed using authentication information, the authentication information being received from the portable terminal apparatus.

17. The non-transitory computer-readable recording medium according to claim 16, wherein:
 the second authentication of multiple subjects needs to be performed; and
 after the second authentication of a first subject is completed, a request for authentication information serving for the second authentication of a second subject is transmitted to the portable terminal apparatus.

18. The non-transitory computer-readable recording medium according to claim 13, wherein:
 the IPP connection request is transmitted from the portable terminal apparatus using a specific protocol; and
 the first authentication is performed using authentication information, the authentication information being received using the specific protocol.

19. The non-transitory computer-readable recording medium according to claim 13, wherein:
 multiple protocols are workable for establishing the IPP connection with the portable terminal apparatus; and
 the second authentication is performed only when the IPP connection with the portable terminal apparatus is established using one of the workable protocols, the one workable protocol being specific.

20. The non-transitory computer-readable recording medium according to claim 13, storing the authentication program, wherein:
 the authentication information consists of multiple elements of authentication information according to a predetermined rule; and
 the elements of authentication information are extracted therefrom, and the second authentication of different subjects is performed using the elements of authentication information extracted therefrom.

21. The non-transitory computer-readable recording medium according to claim 13, wherein:
 the authentication information consists of a title of authentication information and an element of authentication information according to a predetermined rule; and
 the title of authentication information and the element of authentication information are extracted therefrom, and the second authentication of a subject is performed using the element of authentication information extracted therefrom, the subject being indicated by the title of authentication information extracted therefrom.

22. The non-transitory computer-readable recording medium according to claim 13, wherein, when the second authentication is completed unsuccessfully, the IPP connection with the portable terminal apparatus is denied.

23. The non-transitory computer-readable recording medium according to claim 22, comprising:
 storing the authentication program to make the computer further execute determining an allowable limit of the number of authentication failures, the authentication failures to be made in the second authentication, wherein:
  if the second authentication is completed unsuccessfully and the number of the authentication failures does not reach the determined allowable limit yet, a request for authentication information is transmitted and the second authentication is performed using authentication information, the authentication information being received from the portable terminal apparatus in return for the request; or
  if the second authentication is completed unsuccessfully and the number of the authentication failures reaches the determined allowable limit, the IPP connection with the portable terminal apparatus is denied.

24. The non-transitory computer-readable recording medium according to claim 13, wherein it is judged whether or not a print job received from the portable terminal apparatus is an authorized activity of the user, the non-transitory computer-readable recording medium storing the authentication program to make the computer further execute accepting the print job only if it is judged that the print job is an authorized activity of the user.

25. An authentication method for an image processing apparatus, comprising:

transmitting one or more requests for authentication information to a portable terminal apparatus upon receipt of an internet printing protocol (IPP) connection request from the portable terminal apparatus, wherein the IPP connection request is a request for a connection using IPP, the IPP connection request not requiring user identification, and wherein the portable terminal apparatus has an operating system (OS) configured to send a print job from the portable terminal apparatus to the image processing apparatus using IPP;

performing first authentication for the judgment whether or not to permit the IPP connection with the portable terminal apparatus, the first authentication not requiring user identification, by comparing authentication information to first reference data, the authentication information being received from the portable terminal apparatus in return for the request being transmitted;

performing second authentication for the judgment whether or not it is an authenticated user of the image processing apparatus, by comparing the authentication information to second reference data for user identification; and taking one piece of authentication information or any one of multiple pieces of authentication information according to a predetermined rule, the one piece of authentication information or the multiple pieces of authentication information, respectively, being received from the portable terminal apparatus in return for the one or more requests, and performing the second authentication using the one piece of authentication information or the any one of the multiple pieces of authentication information being extracted being taken.

* * * * *